Inventor,
Maurice Leo Kerr,

M. L. KERR.
TRUCK FRAME.
APPLICATION FILED APR. 7, 1921.

1,435,480.

Patented Nov. 14, 1922.

Inventor,
Maurice Leo Kerr,
By Dorsey & Cole
Attorneys.

Patented Nov. 14, 1922.

1,435,480

UNITED STATES PATENT OFFICE.

MAURICE LEO KERR, OF MARION, INDIANA, ASSIGNOR TO INDIANA TRUCK CORPORATION, OF MARION, INDIANA, A CORPORATION OF INDIANA.

TRUCK FRAME.

Application filed April 7, 1921. Serial No. 459,323.

*To all whom it may concern:*

Be it known that I, MAURICE LEO KERR, a citizen of the United States of America, and a resident of Marion, county of Grant, State of Indiana, have invented certain new and useful Improvements in Truck Frames, of which the following is a specification.

The location of the transmission or gear box immediately behind the engine and clutch which has been customary in pleasure vehicles and light automobile trucks has not been found desirable in long and heavy trucks, because the long propeller shaft between the transmission and rear axle is liable to whip, in part due to inaccurate balance. In the design of trucks with a long wheel base an amidship location for the transmission is desirable. This divides the power line, and the long propeller shaft is replaced by two short shafts, one a transmission shaft between the engine and the transmission, and the other a propeller shaft between the transmission and differential. This location also has the advantage of better accessibility for repair and adjustment of both the transmission and the clutch which may be placed at a convenient distance therefrom.

This new location calls for the addition to the frame about midway of the ends, of two substantial cross-members by which the transmission box is supported front and rear. The frame which comprises two long side rails, substantially tied together by end cross-members with corner gusset plates is subjected to a variety of stresses which it must withstand, and in yielding under such stresses it is desirable that the condition of strain be distributed as evenly as possible over the entire frame and not concentrated at particular points with resultant overstrain.

One variety of stress is that which arises when a wheel on one side strikes an obstruction while that on the other side tends to continue in motion. This tends to throw the frame out of square and is resisted by the corner-gusset plates and rigid fastening of the end cross-members. To meet this stress it is desirable that all transverse members be tied to the side rails so as to cooperate in withstanding the same.

Another variety of stress is that which arises when one wheel alone rides over an obstruction or suddenly drops into a chuck hole so as to depart substantially above or below a plane through the points of bearing of the other three wheels. Under these conditions the frame must twist, and if the side rails are not tied together at intermediate points in such a manner as to interfere, the twist will be evenly distributed over the entire frame and it will not be overstrained at any point.

The object of this invention is to provide cross-members between the side rails for the support of the transmission box amidships which while sufficiently substantial for such purpose will not cause an objectionable concentration of strains when the frame is subjected to twisting stresses. A further object is to provide cross-members which while not causing objectionable concentration of twisting strains will cooperate with the end cross-members in resisting such stresses as tend to throw the frame out of square. A further object of the invention is to provide cross-members which while so connected to the side rails as to afford an even distribution of the twisting stresses in the frame will not transmit these stresses to the transmission box.

It is to be understood, however, that the invention is not limited to trucks of the shaft drive type, or to the particular location of the gear boxes above referred to, or to chassis employed exclusively in trucks. It obviously has many advantages in chain drive vehicles, and can be employed with excellent result in the support of loads to be carried directly from the chassis members.

In the accompanying two sheets of drawings which form a part of this application:—

Figure 1:
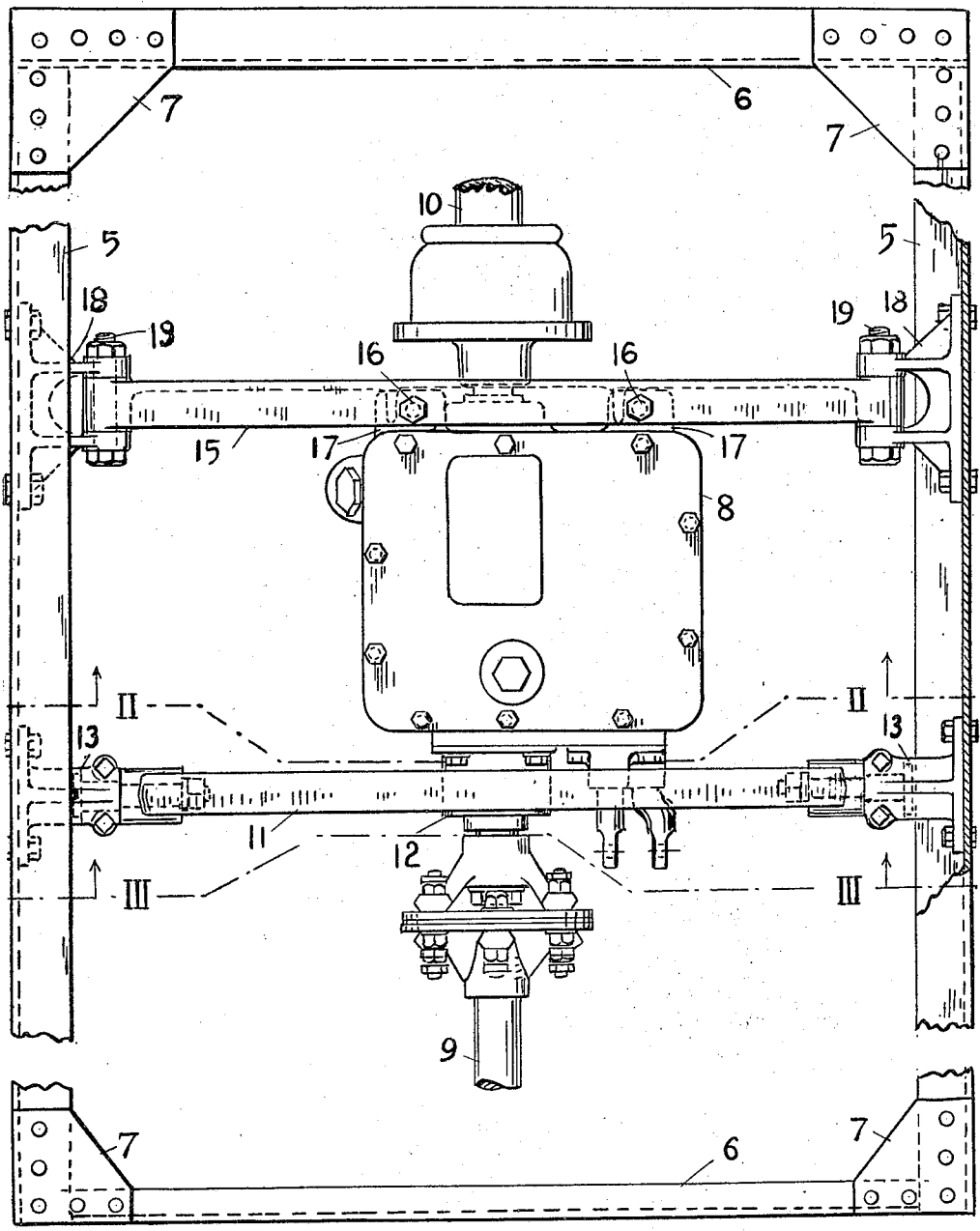
Figure 1 is a plan of an automobile truck frame provided with cross-members for the support of the transmission box in accordance with this invention.
Figure 2:
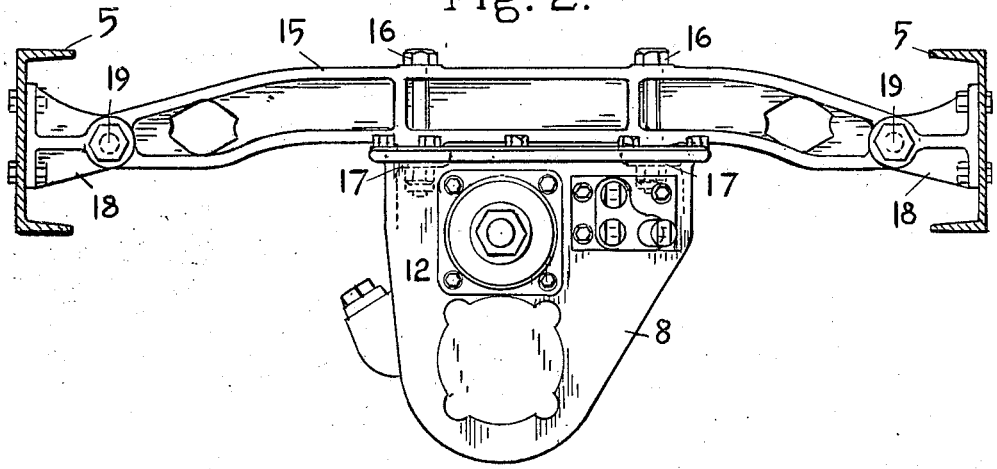
Fig. 2 is a transverse section on the line II—II of Fig. 1 showing the rear cross-member.
Figure 3:
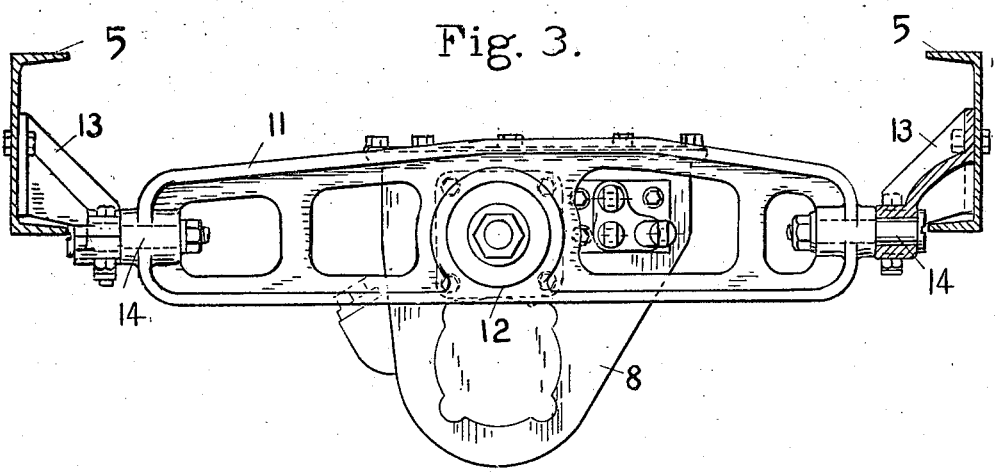
Fig. 3 is a transverse section on the line III—III of Fig. 1 showing the forward cross-member.

The truck frame illustrated comprises side rails 5, 5 tied together at the front and rear ends by cross-members 6, 6, the connections being strengthened by gusset plates 7, 7 at the corners so that the frame will resist angular deformation. A transmission box 8 occupies a position about midway of the frame, power being delivered to it through a transmission shaft 9 and out of it through a propeller shaft 10 to the differential of the rear axle. For the proper support of this transmission box two cross-memebr are provided and connected between the side rails. One is a forward cross-member 11. A trunnion 12 with a longitudinal axis parallel to the plane of the frame projects from the forward end of the transmission box and freely engages a bearing in this cross-member. At each end this cross-member is secured to the side rail through a jointed connection by a bracket 13, comprising a suitable bearing, and a wrist-pin 14 with an axis parallel to the plane of the frame and transverse thereto. The other support for the transmission box is a rear cross-member 15. The box is secured thereto by two vertical bolts 16, 16 which pass through the cross member and lugs 17, 17 at the rear end of the transmission box. At each end this cross-member is secured to the side rail through a jointed connection by a bracket 18, comprising a suitable bearing, and a hinge-bolt 19 with an axis parallel to the plane of the frame and longitudinal thereof.

From the above it will be noted that the transmission box is supported from the intermediate cross-members by a three point suspension, the forward point being rotatable in respect to its cross-member; and that the support is more or less flexible with the resultant transmittance of a minimum amount of stress from the side rails to the transmission box.

It will further be noted that the connection between the transmission box and the side rails has five points about each of which there is a freedom of movement about axes parallel to the plane of the frame, one being at the trunnion projecting from the forward end of the transmission box and the others being at the ends of the two cross-members; so that the frame as a whole is as free to twist as though these cross-members did not connect intermediate points of the side rails thereof.

It will further be noted that none of these axes is in such a direction that there will be any movement about it when the frame is subjected to stresses which would tend to throw it out of square, but that all of the axes are at right angles to bending lines necessary to such deformation, so that in meeting such stresses the frame acts as a whole as though entirely rigid at every point of connection.

The foregoing detailed description has been given for clearness of understanding and no undue limitation should be deduced therefrom, but the appended claims should be construed as broadly as permissible in view of the prior art.

What I claim as new and desire to secure by United States Letters Patent is:—

1. A vehicle frame with two intermediate cross-members, one having connections with the side rails thereof, which connections are jointed to permit relative movement of the cross-members and each side rail about an axis parallel to the plane of the frame and longitudinal thereof, and the other having connections with the side rails, which connections are jointed to permit relative movement of the cross-member and each side rail about an axis parallel to the plane of the frame and transverse thereto.

2. The combination in a vehicle frame of two side rails, cross-members rigidly connecting the side rails, an intermediate cross-member and means for connecting the same to the side rails comprising hinge-bolts with cooperating bearings whereby the hinge-bolts are mounted longitudinally of the side rails, and another intermediate cross-member and means for connecting the same with the side rails comprising wrist-pins with cooperating bearings whereby the wrist-pins are mounted transversely to the side rails.

3. In combination with a vehicle frame, a transmission box, intermediate cross-members at the front and rear of the transmission box for the support thereof having connections with the side rails, which connections are each jointed to permit relative movement of the cross-members and each side rail about an axis parallel to the plane of the frame, and the connection between the transmission box and one of the cross-members being such as to permit relative movement about an axis parallel to the plane of the frame and longitudinal thereof.

4. In combination with a vehicle frame, a transmission box, intermediate cross-members at the front and rear of the transmission box for the support thereof, one of the cross-members having connections with the side rails, which connections are jointed to permit relative movement of the cross-members and each side rail about an axis parallel to the plane of the frame and longitudinal thereof, and the other cross-member having connections with the side rails, which connections are jointed to permit relative movement of the cross-members and each side rail about an axis parallel to the plane of the frame and transverse thereto, and the connection between the last named cross-member and the transmission box being such as to permit relative movement about an axis parallel to the plane of the frame and longitudinal thereof.

5. The combination in a vehicle frame of two side rails, cross-members rigidly connecting the side rails, an intermediate cross-member and means for connecting the same to the side rails comprising hinge-bolts with cooperating bearings whereby the hinge-bolts are mounted longitudinally of the side rails, another intermediate cross-member and means for connecting the same to the side rails comprising wrist-pins with cooperating bearings whereby the wrist-pins are mounted transversely to the side rails, and a transmission box supported from the intermediate cross-members by a three point suspension.

6. The combination in a vehicle frame of two side rails, cross-members rigidly connecting the side rails, an intermediate cross-member and means for connecting the same to the side rails comprising hinge-bolts with cooperating bearings whereby the hinge-bolts are mounted longitudinally of the side rails, another intermediate cross-member and means for connecting the same to the side rails comprising wrist-pins with cooperating bearings whereby the wrist-pins are mounted transversely to the side rails, a transmission box, means for rigidly connecting the transmission box at one end to one of the intermediate cross-members, and means for rotatably connecting the transmission box at the opposite end to the other intermediate cross-member.

Signed at Marion, Indiana, this 30th day of March, 1921.

MAURICE LEO KERR.